United States Patent Office 3,107,660
Patented Oct. 22, 1963

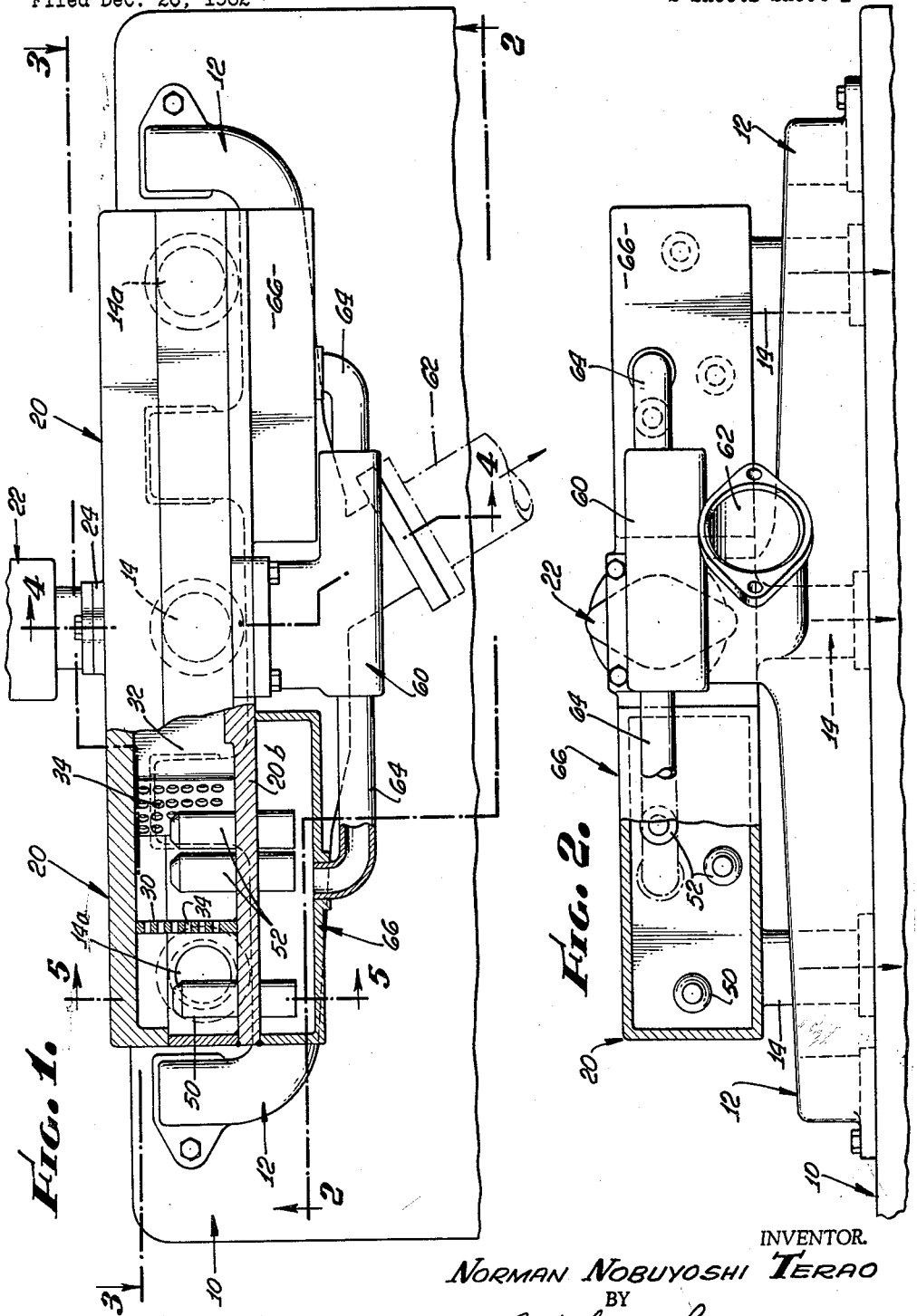

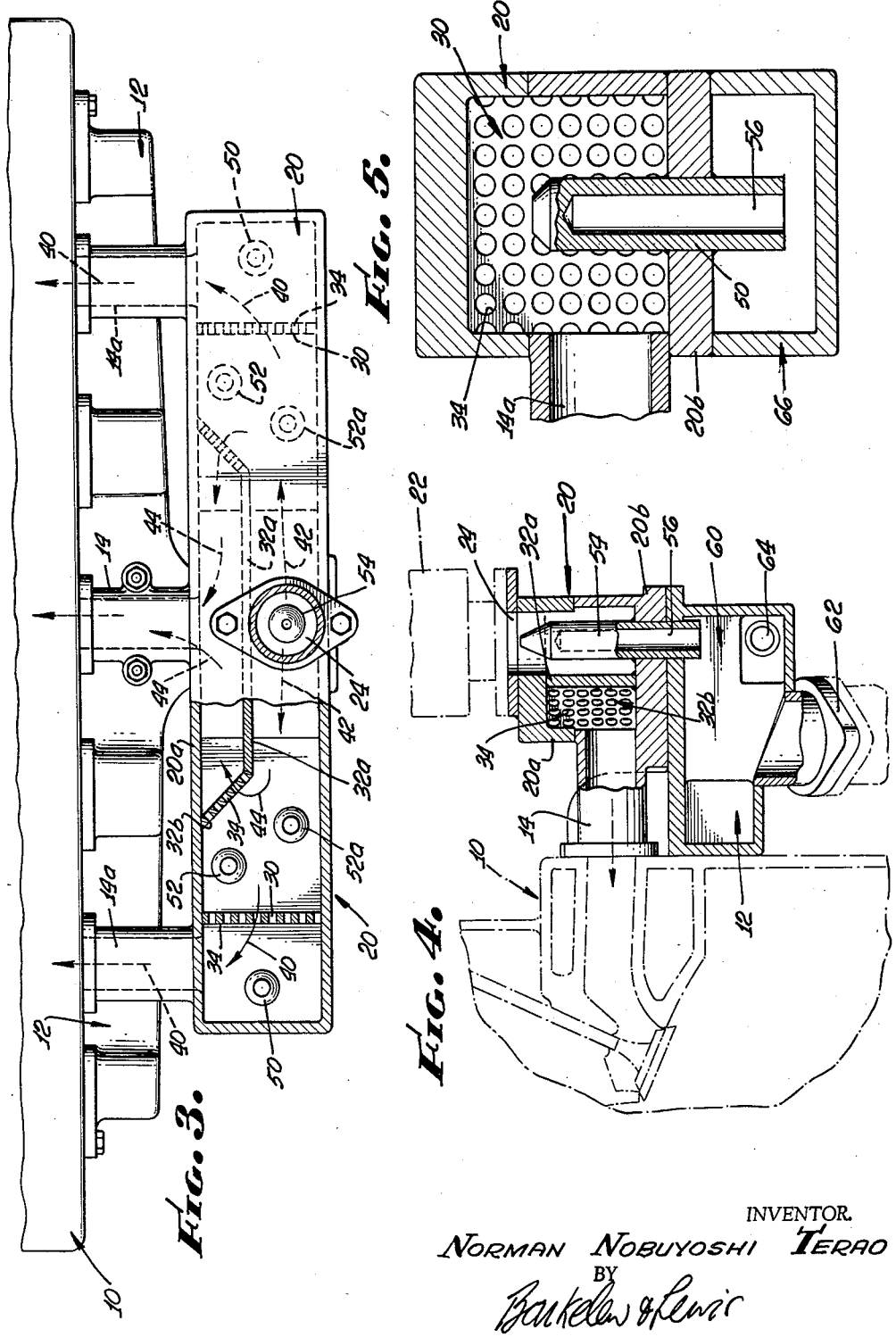

3,107,660
INTAKE VAPORIZER FOR INTERNAL COMBUSTION ENGINES
Norman Nobuyoshi Terao, 6781 Mount Waterman Drive, Buena Park, Calif.
Filed Dec. 26, 1962, Ser. No. 247,214
9 Claims. (Cl. 123—122)

This invention has to do with intake heating for internal combustion engines, the invention providing an improved and novel form of intake heater that may be applied to any conventional engine.

The characteristics of the invention may be generally and briefly described as follows.

An intake manifold is internally fitted with perforated walls which set up flow paths from the initial carburetor feed point of preferably equal lengths to the several cylinder intakes. The total perforation areas in each path are preferably equal; and the tortuous flow paths and the perforations set up turbulence that causes thorough and uniform distribution of the fuel in the carrier air stream.

In each path there is one or more localized heating elements raised to a relatively high temperature by heat here preferably shown as derived from the hot exhaust gases. These localized heating elements, localized in the turbulent flows, temporarily and locally heat the fuel coming into contact, or into their close vicinity, to a relatively high temperature; sufficiently high to cause some cracking or dissociation in the molecular structure of heavier fuels, such, e.g., as kerosene or diesel oil, as well as complete vaporization. But, due to the localization of the heating to high temperature, the over-all temperature of the whole fuel mixture is preferably not raised to such a high intake temperature as to materially reduce over-all engine efficiency due to that factor.

I find that complete vaporization and/or cracking, with uniform fuel distribution in the mixture, has the effect of markedly increasing the over-all engine efficiency; and enables conventional engines to utilize fuels considerably heavier, and having considerably higher heat content, than conventional fuels such as gasoline. And, with any fuel, including lower grade fuels, more nearly complete and perfect combustion of the fuel is attained, minimizing exhaust of unburned residues into the atmosphere. This results, for instance, in greater automobile milege and longer engine life.

These and further characteristics of the invention will be best understood from the following detailed description of the preferred design and embodiment shown in the accompanying drawings, wherein:

FIG. 1 is a side elevation, with parts in section, showing the preferred embodiment mounted on a conventional cylinder block;

FIG. 2 is a bottom plan of the same taken as indicated by 2—2 on FIG. 1, with parts in section;

FIG. 3 is a plan, in the aspect of 3—3 on FIG. 1, with parts in section;

FIG. 4 is a cross section on 4—4 of FIG. 1; and

FIG. 5 an enlarged detail section on 5—5 of FIG. 1.

In the drawings, 10 represents a conventional cylinder block with an exhaust manifold represented at 12, and intake portings at 14. The special intake manifold is generally designated at 20, a carburetor at 22, and the carburetor feed connection to the intake manifold at 24 centrally of the length of that manifold.

As shown more particularly in FIGS. 1, 3 and 4, the interior of the intake manifold is provided (for the illustrated engine with three intake ports) with three perforated walls 30, 30 and 32, with perforations 34 through them. Perforated walls 30, 30, are cross-walls across the manifold interior located between the carburetor feed connection 24 and the two cylinder portings 14a. Wall 32, in this particular design for an engine with three intake ports, has a main central portion 32a extending from top to bottom, and longitudinal of the manifold, in a transverse location spaced between inner manifold wall 20a and the intake feed connection 24, as more particularly shown in FIGS. 3 and 4. At each end of that longitudinal wall portion 32a, there is an integrated perforated wall portion 32b extending, preferably diagonally, across the space between 32a and manifold wall 20a.

The flow streams, indicated by arrows 40, 42 from carburetor feed 24 to the two cylinder portions 14a pass through the perforations 34 of cross walls 30. The flow from 24 to the central cylinder intake port 14 is divided into two streams, indicated by the arrows 42 and 44, each passing through the perforations 34 of one of the diagonal walls 32b. As shown in FIG. 3, the flow lengths from 24 to 14a, 14a, and also to 14, are equal; and the total perforation areas in cross walls 30 are each equal to the total perforation areas in the two diagonal walls 32b. The flows to the several cylinder intake ports are consequently equal; and each flow is thoroughly agitated and the fuel of the mixture uniformly distributed in the carrier air flow. The perforations, the tortuous flows and the heating elements 50, 52 located in the flow paths cause turbulence throughout the flow paths.

In each of the several flow paths and also initially at the carburetor connection 24, there are localized heater elements 50, 52 and 54. Each of these elements extends up through and above the bottom wall 20b of intake manifold 20, and each has an internal bore 56 open at its bottom and closed at top, as best shown in FIGS. 4 and 5 which show the elements 50 and 54. Elements 52 are identical in form with 50 as it is shown in FIG. 5. Each of these several heater elements is preferably composed of high heat conductive material, e.g., copper; and, as explained below, hot exhaust gases have access to the lower projecting ends of the elements and also into their bores 56. In average operation the exhaust gases of a conventional engine of a passenger automobile, for example, may well be at a temperature of approximately 750° F. or more; those of trucks and busses are usually considerably higher. Each localized heat conductive heating element in the flow paths is consequently maintained at such a relatively high temperature.

As will be apparent from the heating element locations shown more particularly in FIG. 3, the whole flow through carburetor connection 24 first passes down over heater element 54. Then the divided streams 44 flow over both elements 52 (mainly over 52a) and the streams 40 flow over elements 52 (mainly over 52a) and also over 50. Substantially equal heating is thus applied locally to all three turbulent flows, heating each agitated flow locally to the relatively high temperature.

Exhaust manifold 12 incorporates and communicates with a central box-like chamber 60 that underlies the central part of the intake manifold 20 and from which the exhaust discharge 62 leads off. That chamber 60 communicates via passages 64 with two boxes 66 that underlie the outer parts of the intake manifold, as best shown in FIG. 1. The central heating element 54 projects its lower open end down into chamber 60; the several heating elements 50 and 52 project their lower open ends down into the two boxes 66, as shown for those at the left in FIGS. 1 and 5. The hot exhaust gases thus have access to the lower ends of all those heating elements and to their internal bores. Although the exhaust gases do not circulate through the heating elements, convection flows cause the gases cooled by conduction and radiation from the upper ends of the elements in the intake manifold to stream down through 60 and 66, to be replaced by hot gases moving up from 60 and 66. The heating elements in the intake manifold are thus kept up to a temperature not far below that of the exhaust gases in exhaust manifold 12.

I claim:

1. A vaporizing system for the intake of an internal combustion engine comprising in combination
    an elongate intake manifold having an initial central feed connection to a carburetor and port outlets to several engine cylinders spaced along the length of the manifold,
    perforated walls in longitudinally spaced positions internal of the manifold and lying across each of the flow paths from the initial feed connection to the several cylinder ports,
    and localized and heated heating elements projecting into the interior of the manifold in each of said flow paths.

2. The combination defined in claim 1 and in which all said flow paths are of substantially equal length.

3. The combination defined in claim 2 and in which the total wall perforation areas across the several flow paths are substantially equal.

4. The combination defined in claim 1 and in which the total wall perforation areas across the several flow paths are substantially equal.

5. The combination defined in claim 1 also including an exhaust manifold and chambers communicating with the exhaust manifold and lying against a wall of the intake manifold,
    and in which said heating elements project their ends from said wall into both the intake manifold interior and into said chambers,
    said heating elements being of heat conductive material.

6. The combination defined in claim 5 and in which said heating elements have internal bores open at their ends in said chambers and closed at their ends in the intake manifold.

7. The combination defined in claim 1 also including an exhaust manifold and chambers communicating with the exhaust manifold and lying against a wall of the intake manifold,
    and in which said heating elements project their ends from said wall into both the intake manifold interior and into said chambers,
    said heating elements have internal bores open at their ends in said chambers and closed at their ends in the intake manifold.

8. The combination defined in claim 1 and in which one of said port outlets to an engine cylinder is also centrally located on the intake manifold in substantially the transverse plane of the initial feed connection,
    and in which the perforated wall lying across the flow path from the initial feed connection to said centrally located port comprises an imperforate longitudinally extending wall portion spaced transversely between the initial feed connection and a longitudinal wall of the intake manifold,
    and perforated wall portions extending from the ends of said imperforate portion to said longitudinal wall.

9. The combination defined in claim 8 and in which other perforate walls lie across the interior of the intake manifold between the initial feed connection and others of the cylinder ports,
    and in which said heater elements include at least one projecting into the interior of the intake manifold in each location between said last mentioned perforate walls and said other cylinder ports, and at least one in each location between the initial feed connection and said perforate wall portions.

References Cited in the file of this patent
UNITED STATES PATENTS

| | | |
|---|---|---|
| 1,374,927 | King | Apr. 19, 1921 |
| 1,690,520 | Aske | Nov. 6, 1928 |
| 2,651,507 | Heinecke | Sept. 8, 1953 |